(No Model.) 5 Sheets—Sheet 1.

H. P. TOBEY & G. B. THAYER.
ORE CONCENTRATOR.

No. 560,552. Patented May 19, 1896.

WITNESSES
Wm A. Leonard
Luke Hilliard

INVENTORS
Horace P. Tobey
Geo. B. Thayer (No Model.) 5 Sheets—Sheet 3.

H. P. TOBEY & G. B. THAYER.
ORE CONCENTRATOR.

No. 560,552. Patented May 19, 1896.

WITNESSES
Wm. A. Leonard
Luke Hillard

INVENTORS
Horace P. Tobey
Geo. B. Thayer (No Model.) 5 Sheets—Sheet 4.

H. P. TOBEY & G. B. THAYER.
ORE CONCENTRATOR.

No. 560,552. Patented May 19, 1896.

WITNESSES
Wm. A. Leonard
Luke Hillard

INVENTORS
Horace P. Tobey
Geo. B. Thayer

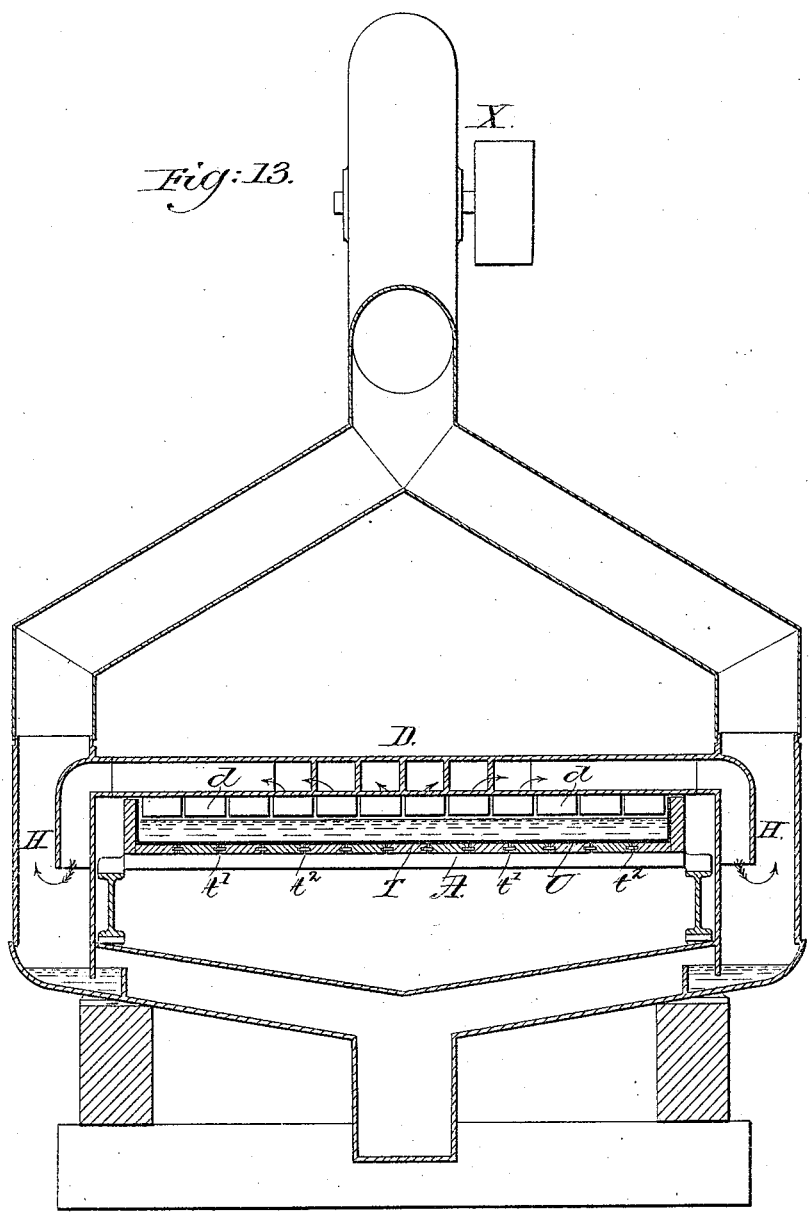

UNITED STATES PATENT OFFICE.

HORACE P. TOBEY, OF WAREHAM, AND GEORGE B. THAYER, OF BOSTON, MASSACHUSETTS.

ORE-CONCENTRATOR.

SPECIFICATION forming part of Letters Patent No. 560,552, dated May 19, 1896.

Application filed August 30, 1886. Serial No. 212,266. (No model.) Patented in England October 25, 1884, No. 14,152, and in Canada November 3, 1884, No. 20,458.

*To all whom it may concern:*

Be it known that we, HORACE P. TOBEY, of Wareham, in the county of Plymouth, and GEORGE B. THAYER, of Boston, in the county of Suffolk, Commonwealth of Massachusetts, have invented certain new and useful Improvements in Ore-Concentrators, (for which we have obtained patents in the following countries: the United Kingdom of Great Britain and Ireland October 25, 1884, No. 14,152, and in the Dominion of Canada November 3, 1884, No. 20,458;) and we do hereby declare the following to be a full, clear, and exact description of our invention, reference being had to the accompanying drawings, which form part of this specification, in which—

Figures 1, 12:
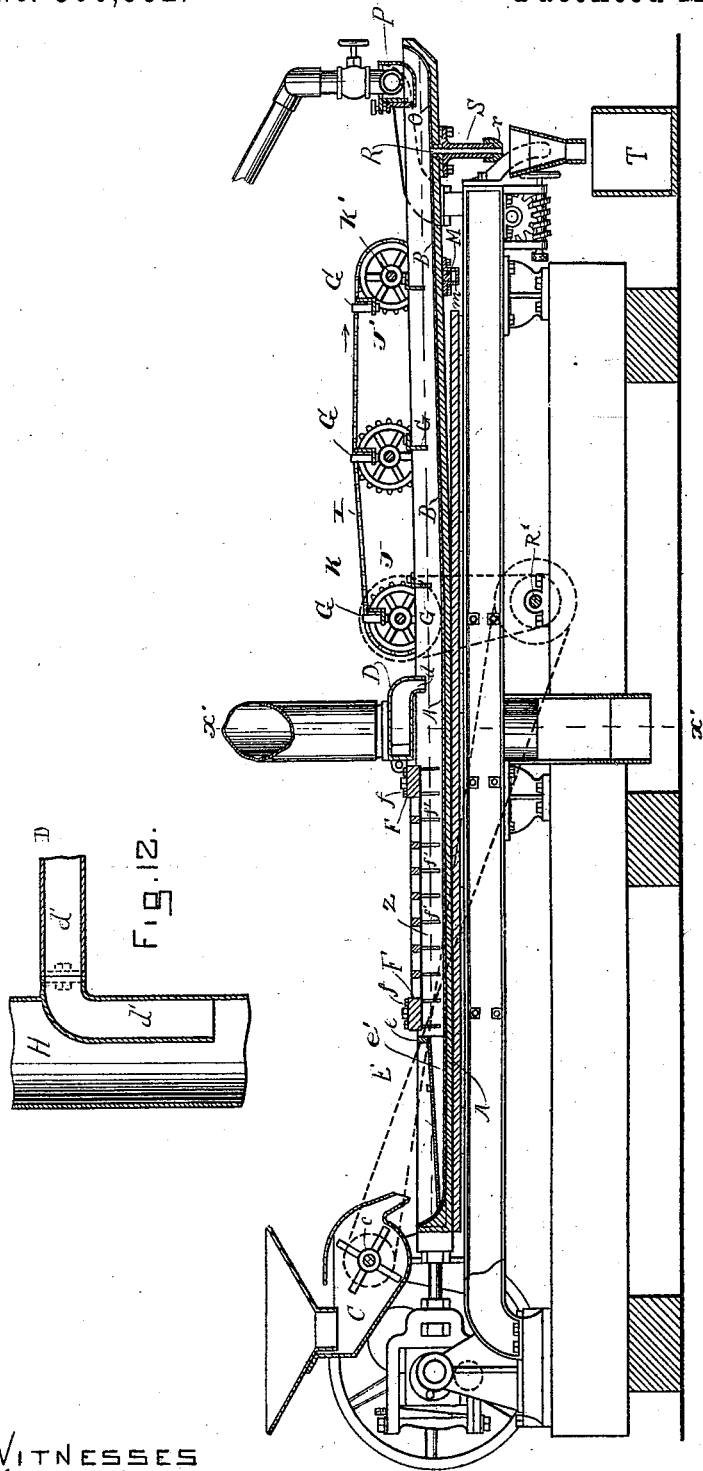
Figure 2:
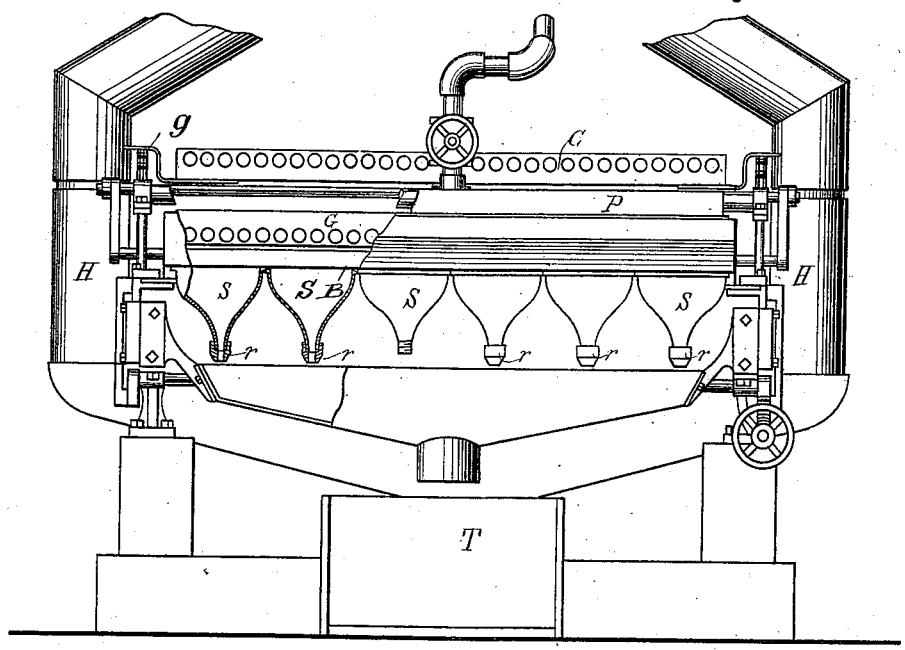
Figure 3:
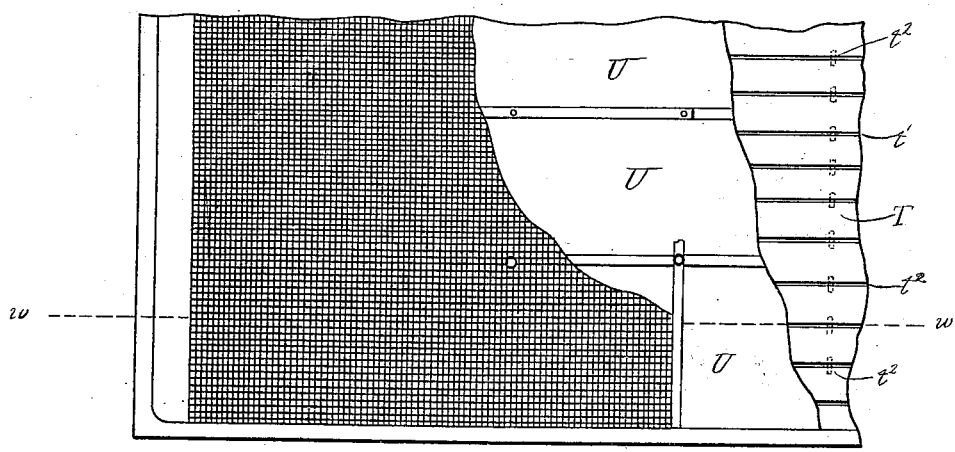
Figure 4:
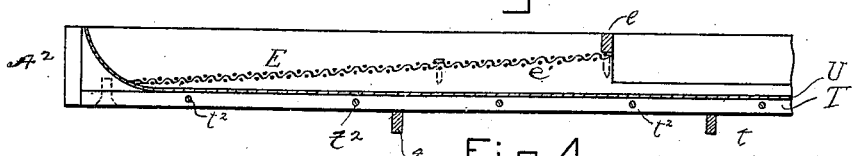
Figure 5:
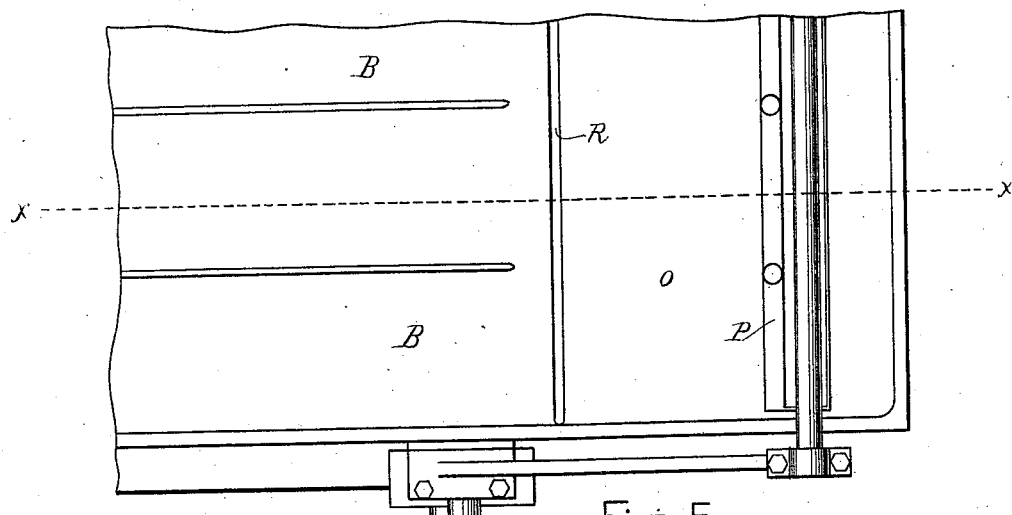
Figure 6:
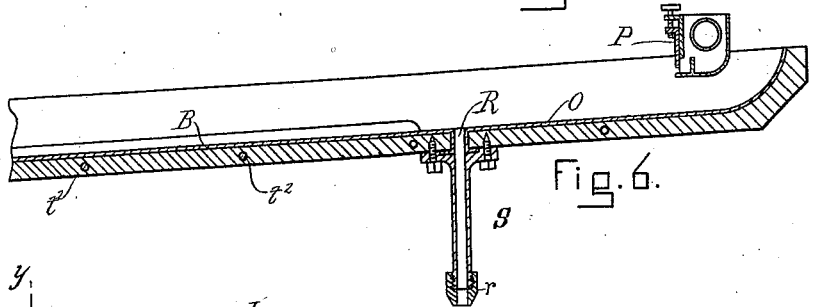
Figure 7:
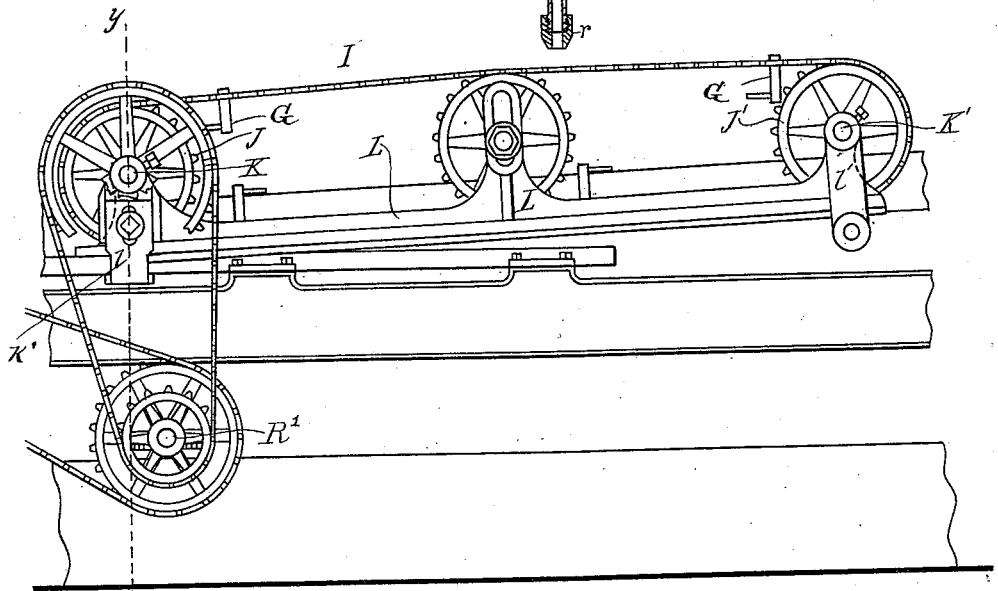
Figure 8:
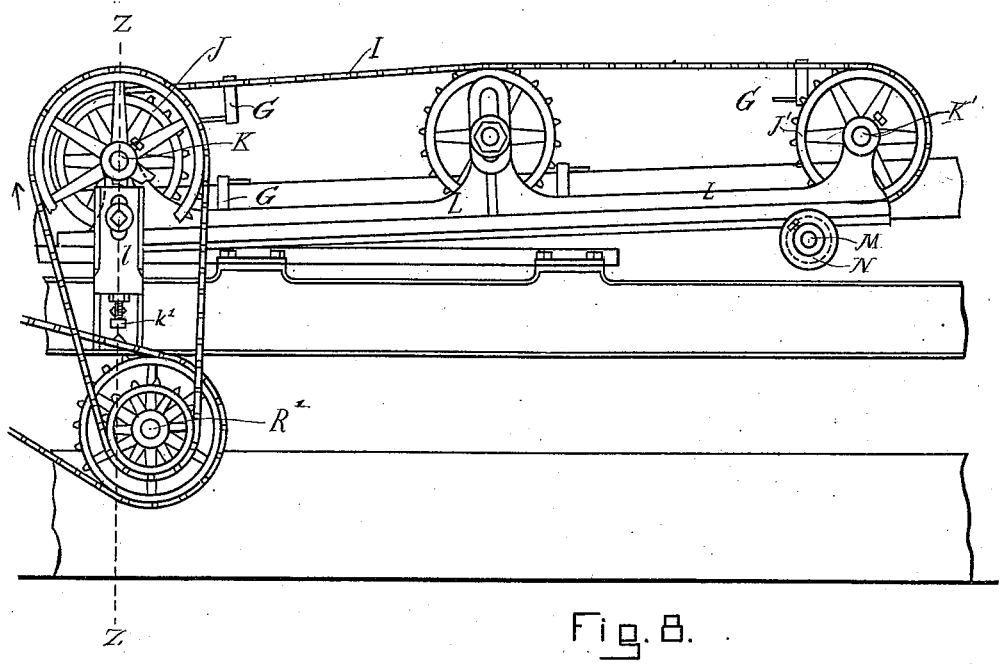
Figures 9, 10, 11:
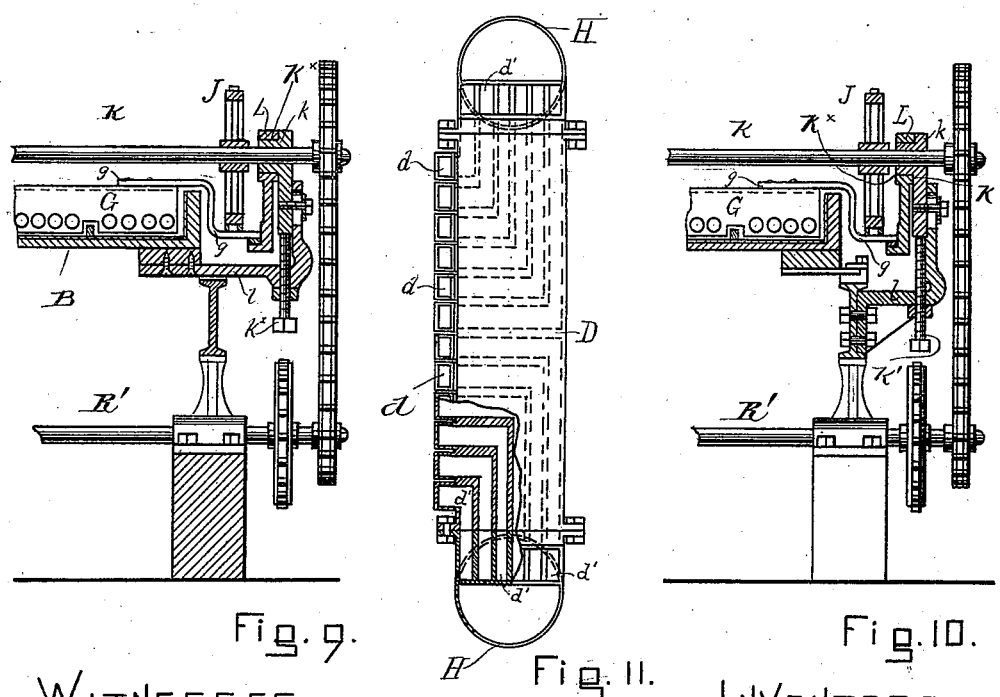

Figure 1 is a central longitudinal vertical section of a machine embodying our improvements. Fig. 2 is an end view of the machine, shown partly in section, taken at the right-hand end of Fig. 1. Fig. 3 is a partial top view, enlarged, of the end of the tray upon which the pulp is fed. Fig. 4 is an enlarged vertical section of that end of the tray upon which the pulp is fed, taken on line $w\,w$ of Fig. 3. Fig. 5 is a partial top view, enlarged, of that end of the tray on which the wash-water is distributed. Fig. 6 is an enlarged longitudinal vertical section taken on line $x\,x$ of Fig. 5. Fig. 7 is a side view, enlarged, of the scraping devices as attached to the tray. Fig. 8 shows the same as attached to the frame of the machine. Fig. 9 is an enlarged transverse section taken on line $y\,y$ of Fig. 7. Fig. 10 is an enlarged transverse section taken on line $z\,z$ of Fig. 8. Fig. 11 is an enlarged bottom view, shown partly in section, of the exhaust-tube and its attached settling-chambers. Fig. 12 is a vertical section of one of the settling-chambers taken through one of the passage-ways for the ore and water; and Fig. 13, a vertical cross-section taken on the dotted line $x'\,x'$, Fig. 1.

Our improvements relate to certain devices applicable to ore-concentrators which separate the pulverized materials of ores by shaking such materials upon an ore-bed in presence of water in order to bring about a stratification, and then by subjecting the stratified materials to the action of currents of water in order to wash away and remove the upper worthless layers of gangue; and our improvements have for their object to effect the saving of a larger percentage of the valuable finer particles of ores than is done by processes now in use. The mineral constituents of all ores are extremely brittle and are more easily broken than the masses of gangue with which they are associated. In consequence, when such ores are pulverized, a large proportion of the mineral parts are reduced to a fine state of division and the loss of mineral in concentrating such ores is often almost entirely due to the difficulty of saving these finer portions, which are called "slimes." The loss of these slimes usually occurs in one of three ways, viz: first, a portion consisting of the very finest particles having a film of air covering or partly covering their surface is buoyed up thereby and forms a light scum on the surface of the water, on which they float away and are lost; second, another portion, although thoroughly wetted, being too fine to sink during the time it was passing over the concentrator, is carried off in suspension in the water beneath its surface; third, another portion of those slimes, which has settled upon the ore-bed, is lost by being stirred up during the final stages of the washing to which the mineral is subjected in order to remove the last traces of the gangue, and this last-mentioned loss, in the ordinary methods of concentration, generally arises from the fact that these methods require that all the gangue shall be removed by the scouring action of the wash-water, and this removal of the gangue can be accomplished only by giving an excessive steepness to the washing-incline, so as to increase the scouring effect of the water flowing over it, or by the use of an excessive amount of water.

The loss of fine mineral in ordinary methods of concentration, occurring through excessive steepness of washing-incline and the use of an excessive amount of wash-water, is still further aggravated by the imperfect methods of delivering the wash-water, the water being allowed to fall upon the layer of separated mineral at the head of the washing-incline with sufficient force to cause a re-suspension of the finer particles which are thus carried down with the current of water and lost.

Briefly stated, our improvements consist in devices for the following purposes: first, to effect the preliminary removal from the mass of the pulp to be treated of the so-called "float material;" second, to lessen the amount of wash-water required by the removal from the stratified pulp of the larger portion of the upper layer of gangue by mechanical devices operated by power and to diminish the steepness of the inclined part of the ore-bed whereon the washing takes place; third, to deliver the wash-water required for the removal of the last traces of gangue in such manner as to cause no disturbance of the fine material as it approaches the upper part of the washing-incline.

Our improved devices are adapted to be used with nearly all the more common forms of concentrating-machines, including those of the classes known as "shaking-tables," "percussion-tables," and "endless traveling-belt machines," and even to some forms of dry concentrators, and we therefore do not wish to limit their application to the particular machine shown in the drawings nor to the precise form therein shown.

The drawings illustrate our improvements applied to the concentrating-machine which is the subject of United States Patent No. 326,808, dated September 22, 1885, to which patent reference is made for a full description of those parts not herein described.

A represents the horizontal "settling-compartment" of the reciprocating ore bed or tray.

B represents the inclined portion of the tray, which we designate as the "washing-incline."

C represents the "pulp-distributer."

D represents the "discharging-tube" connected with the exhaust-fan X, which removes the gangue and water.

At the left-hand end of the compartment A, in Fig. 1, we attach to the tray a pan E, having substantially the form shown in section in Fig. 4. This pan E extends entirely across the end of the compartment A, and its rear end and sides are made to closely conform in shape to the rear end and sides of the tray and are firmly secured thereto. The bottom of the pan E is supported by the wedge-shaped cleats $e'$ and is formed of a netting or screen of woven wire or punched plate with meshes or holes sufficiently open to allow the particles of ore to pass freely through it. This netting or screen at its rear end should be immersed in the water contained within the compartment A, starting a little above the surface of the tray and inclining upwardly from thence to its forward end, which should project slightly above the surface of the water-level in the tray. An upright partition $e$ along the front end of the pan E retains the light scum or float material, which can be removed therefrom from time to time as it accumulates.

This screen-bottomed pan E may be attached to the tray and move with it, or may be independently supported above the tray, and in the latter case it may either be stationary or may be combined with means for imparting to it the shaking movements which facilitate the passage of the pulp through it. We prefer that the pan E should be arranged in the manner shown, intermediate between the pulp-distributer and the compartment A, since when it is attached to the reciprocating tray the variable movements of the latter cause all the coarse particles which remain on the screen to travel forward to the upper end of the screen, so as not to obstruct the free passage of the pulp through the screen. It is obvious, however, that our device would be equally effective if arranged to remove float material either from the pulp before it enters the distributer or from the tailings as they are discharged from the settling-chambers H H. Between the pan E and the exhaust-tube D is shown a framework F, fixed to the supporting-frame of the machine by means of brackets $ff$, &c., and having a large number of stirring-pins $f'$ projecting from it into the mass of pulp which lies upon the horizontal compartment A, the object of these stirring-pins being to keep the pulp in a loose condition in order to promote its stratification.

We prefer to locate the exhaust-tube D at a point upon the washing-incline B a little in advance of the point of junction of this compartment with the compartment A. This exhaust-tube may be constructed in the form shown in United States Patent No. 326,808, above referred to, with a single induction-orifice in the form of a continuous slot extending across the tray and opening into a tube with a single passage-way for the ore and water. We prefer, however, to make the exhaust-tube D, as shown in Figs. 1, 11, 12, and 13, with a series of separate induction orifices or mouths $d\ d$, &c., extending in a line across the width of the tray, each orifice or mouth having its separate passage-way $d'$ for the ore and water, which passage-ways $d'\ d'$, &c., after entering the settling-chambers H H should extend downward to a point considerably below the level of the surface of the ore-bed in order to form siphons and increase their discharging capacity. (See Fig. 13.)

Figs. 7, 8, 9, and 10 show clearly the construction of our scraping device, the object of which is to enable us to control the depth of the accumulation of gangue and mineral upon the washing-incline B and to remove from this incline the greater part of the gangue by purely mechanical means without the aid of water. The mechanism employed for this purpose consists of a number of scraping-blades G, which are caused to move downward over the inclined washing-incline B and at a certain adjustable distance above it. To each end of these scraping-blades G is attached an arm $g$, by means of which the blades are secured to two endless carrier chains or belts I I, one upon either side of the tray, which extend over sprocket-wheels J J and J' J'. The form given to the scraping edge of the blades G may be varied to suit the character of the ore under treatment. In cases of ores where the stratification of the mineral and gangue is quite distinct, the edges may have the form of a continuous plate or sheet without perforations. We have found the form shown in Figs. 2, 7, 8, 9, and 10 well adapted to all ordinary kinds of ores. In this form the scraper-plate has a series of perforations above its scraping edge, this edge being continuous from side to side of the tray. The sprocket-wheels J J are secured to a driving-shaft K, which is rotated in any convenient manner to give motion to the scraping-blades G. The sprocket-wheels J' J' are similarly secured to an idler-shaft K'. The shaft K turns in bearings $k$ sliding in grooved ways or seats formed on the brackets $l$. These sliding bearings $k$ rest upon set-screws $k'$, passing through the brackets $l$, whereby the height of the lower edges of the scraping-blades above the ore bed can be adjusted. The shaft K' turns in bearings formed in the two side pieces L and L. The side pieces L and L are pivoted at the end nearest the exhaust-tube D about the bosses $k^x$, formed on the inner side of the bearings $k$ of the shaft K. The supporting-brackets $l\ l$ may be secured either to the tray, as shown in Figs. 7 and 9, and partake of its reciprocating movement, or to the frame of the machine, as shown in Figs. 1, 8, and 10. In case the brackets $l\ l$ are secured to the tray, the upper end of the side pieces L L must be pivoted to the brackets $l'\ l'$, and these brackets must themselves be pivoted to the tray in order to allow the inclination of the washing-incline B to be changed.

In case the brackets $l\ l$ are secured to the frame of the machine, as shown in Figs. 8 and 10, it becomes necessary to preserve a constant distance between the lower edge of the scraping-blades and the surface of the tray during the backward and forward movements of the latter. This is accomplished in the following manner: We attach to the under side of the tray a rod or shaft M, (shown in Fig. 1,) the position of which at the middle of the forward and backward stroke of the tray should be nearly vertically underneath the shaft K'. The rod M has formed upon its two extremities journals for the friction-rollers N, on which rests a plane bearing-surface formed upon the lower edge of the side pieces L and L. This rod M is held in bearings $m\ m$, fixed to the under side of the tray and is preferably made vertically adjustable in the bearings $m\ m$ in order to regulate the distance between the surface of the inclined compartment B and the lower edge of the scraping-blades. The driving-shaft K is driven from the agitator-shaft $c$ of the distributer C by means of a belt or chain in the usual manner in case the brackets $l$ and $l$ are attached to the frame of the machine, but in case these brackets are attached to and move with the tray it is better, in order to avoid alternate slackening and tightening of the driving belt or chain, to drive the shaft K from a counter-shaft R' vertically under K, as shown in Fig. 7, or overhead.

We are aware that the lighter layer of gangue has been heretofore removed from above the heavier layer of stratified mineral by the use of scraper-blades having a reciprocating motion, such blades being held in working position during the forward part of the stroke and being raised out of contact with the ore during the backward stroke, and we therefore claim the use of scraper-blades only when attached to endless traveling belts or chains and operating substantially in the manner described and shown herein. We are also aware that toothed rakes of special form attached to endless traveling belts have been used for stirring the mass of ore on an ore-bed, the direction of travel of such rakes being opposite to that of the movement of the gangue, which is removed entirely by the action of the wash-water. We therefore do not claim the use of toothed scrapers when constructed and operated in this manner.

In the United States Patent No. 326,808, referred to above, improved means of delivering the wash-water are shown, which, however, are not free from objections and do not fully accomplish their intended purpose of delivering the wash-water upon the cleaned layer of mineral, exposed, at the head of the inclined part of the tray, without the violent impulse of an abrupt fall or an excessive velocity of movement. There are serious objections to the use of the broad shallow basin or depression described in the above-mentioned Patent No. 327,808, and of similar basins described in other patents, which objections it is the purpose of our present construction to avoid. The use of such basins at the head of a rapidly-reciprocating ore-bed is principally objectionable from the fact that the motion of the basin produces an irregular motion of the considerable mass of water contained within such basin, and, in consequence, the wash-water is delivered therefrom in successive waves without that steady uniformity of flow we secure by the construction shown in Figs. 1, 5, and 6. The combination of parts for the delivery of the wash-water shown in Figs. 1 and 5 have for their object to deliver the wash-water upon the cleaned mineral coming up the inclined washing-incline B in a uniform sheet across the width of the tray, allowing the water to reach the mineral layer without falling upon it from above and to flow quietly over it with the same velocity before and after reaching it.

B in Fig. 5 represents the upper part of the washing-incline, in line with which the water-apron O is continued upward to form a surface to receive the first impact of the water issuing from the water vessel P. The washing-incline B terminates abruptly at its upper end and the water-apron O terminates in the same manner at its lower end, and these parts are secured in place so as to leave a narrow space between them which forms a continuous slot R, extending transversely across the tray at the upper part of the washing-incline, through which the mineral falls by its own gravity, assisted by a slight downward current of water, which, owing to our novel arrangement of the parts, is of uniform force throughout the whole area of our discharging-slot and thereby insures the downward passage of the very finest particles of the mineral to be saved. It is necessary to be able to control the force of the downward current of water, and this may be done by making the water-apron adjustable, so as to increase or diminish at will the width of the slot R. We prefer, however, the construction shown in Figs. 1, 2, 5, and 6, the width of the slot remaining fixed and its area being slightly in excess of that necessary for the discharge of the mineral. In this case the mineral is automatically discharged by its own gravity as soon as it reaches the slot, its downward passage being facilitated by the downward current of water within the slot above referred to. Upon the proper regulation of this downward current of water within the body of the slot the efficiency of our machine will greatly depend. On the one hand the current must be sufficiently strong to insure the downward passage of the minutest particles of mineral to prevent their becoming suspended in and floating down with the main body of the wash-water, and on the other hand it must not be so violent as to cause any sensible disturbance of the sheet of wash-water, which should flow quietly over the slot from the water-apron O to perform its work upon the washing-incline B. The regulation of this downward current of water within the slot we prefer to make by means of the regulating-valves $r$ $r$, &c., through which both mineral and water are discharged. The regulating-valves $r$ $r$, &c., are formed at the lower end of the narrow collecting troughs or sluices S S, &c., which are of the ordinary form used for similar purposes. These collecting-troughs S S, &c., are attached to the under side of the washing-incline B and of the water-apron O in such manner that their front and rear walls form a downward and nearly vertical continuation of the edges of the slot R, while their sloping sides serve to collect the mineral falling upon them and to conduct it to the regulating valves or nipples $r$ $r$, &c. These regulating-valves may be of any of the ordinary forms of gate-valves or straightway valves capable of giving an adjustable area of opening. We prefer, however, to provide for this purpose several sets of nipples or caps $r$ $r$, &c., each set having round discharge-holes of varying diameters to give the desired area of discharge, to thus regulate the flow of water therethrough, since this round form of orifice is less liable to become obstructed than any other of the same area.

In Figs. 3 and 4 is illustrated our improved construction of an ore-bed. It is important that this rapidly reciprocating part of a concentrator should possess the qualities of lightness and stiffness, and especially should not be liable to any distortion of its plane upper surface through warping or twisting of the materials of which it is made. As ordinarily made, lightness and stiffness are secured by making the ore-bed of wood. Ore-beds constructed of this material, however, even when their upper surface is protected from dampness by a covering impervious to water, such as rubber or metal, are so affected by the dampness existing in a mill that it has been found impossible to prevent the distortion or warping above referred to. This difficulty we overcome in the following manner: The supporting-surface for the ore-bed proper we make up of separate strips of seasoned wood T about three inches wide, running lengthwise of the tray. These strips are attached at intervals of about two feet to transverse stiffening-braces $t$ in such manner as to leave an open space $t'$ between the adjacent strips. With this construction the only effect of the swelling of the fibers of the wood through the absorption of moisture is to close up more or less the spaces $t'$ $t'$ and the general surface of the tray remains at all times truly plane. The series of strips T T, &c., we cover with rubber or metal or other suitable material U in the usual manner. When the transverse braces $t$ are placed at a considerable distance apart, to prevent between the braces $t$ any vertical displacement of any strip above or below the plane of its adjacent strips, we secure all the strips together by one or more series of dowels. (Shown in dotted lines at $t^2$, Fig. 3.) Each of the dowels $t^2$ may be secured to one of the strips but must be left free to move in the hole made for it in the adjacent strip. Instead of using the dowels $t^2$ the ordinary tongue-and-groove construction will accomplish nearly the same purpose. We prefer the use of the dowels $t^2$, since this construction is stronger and allows free access of air to the entire edges of strips, thus preventing any unequal absorption of moisture by their upper and lower edges.

The operation of our improved concentrator is as follows: The ore mingled with water is fed into the distributer C and flows thence into the pan E, where all particles too coarse for concentration are arrested by the screen in the ordinary manner. All the remaining parts of the ore that will sink freely pass through the screen while the floating material is moved by the current toward those of the meshes of the screen forming the bottom of the pan E, which are even with or above the surface of the water, and is retained in the following manner: The agitation given the water by the reciprocating movement of the tray causes those meshes which are above the surface of the water to become closed by a film of water for a considerable distance above the level of the water contained within the horizontal compartment A, and this film of water serves to retain the floating material above the screen and within the pan E, and this floating material may be removed when a sufficient amount has accumulated, and may then be subjected to such further treatment as its nature may require. It will be seen that by this device we can compel a screen with large meshes to do the work of a fine screen without interruption to its ordinary work of arresting coarse particles of rock and other materials, which would interfere with the process of concentration if allowed to go upon the concentrator. The remaining portions of the ore pass through the meshes of the screen, and the operation of stratification proceeds as described in the United States Patent No. 326,808, above referred to.

In the present machine it will be observed that the stirring effect of the pins $f'$ upon the pulp is due solely to the reciprocating movements of the tray, the pins themselves being attached immovably upon the frame of the machine. We are aware that this arrangement of stationary stirring-pins above a reciprocating ore-bed is not novel, and shall make no claim thereto.

The pulp arriving at the exhaust-mouths $d$ $d$, &c., is in a stratified condition, the heavy mineral particles forming the lower stratum, overlying which is a layer of gangue, and above the latter is the water fed into the distributer with the ore, the level of which is indicated by the line Z, Fig. 1. The exhaust-mouths $d$ $d$, &c., being adjusted at a proper distance above the surface of the ore-bed, remove the water and a portion of the layer of gangue, allowing the remaining part of the gangue and all of the lower layer of mineral to pass onward to the inclined washing-incline B.

The scraping-blades G, moving downward over the incline B at an adjustable distance therefrom, carry downward before them the upper part of the layer of gangue as fast as it collects upon the washing-incline B, depositing it so close to the exhaust-mouths that the latter may remove it together with the wash-water supplied at the head of the machine, the lower layer of mineral passing freely up the incline through the space between the lower edges of the scraping-blades G and the surface of the washing-incline. The use of this purely mechanical device for carrying the gangue down the inclined washing-incline B, besides effecting a notable saving in the amount of wash-water required at the head of the machine and reducing the inclination to be given to the incline B, has the further advantage of enabling us to control the depth of the layer of mineral and gangue thereon within such limits that the reciprocating motion of the tray may keep the layer "alive" and prevent that "packing" of the pulp which is fatal to good work. With freely-concentrating ores this device may, by proper adjustment of the distance between the scraping-blades G and the tray, according to the ore under treatment, be made to perform the entire work usually performed by the wash-water, making it necessary to supply from the water vessel P only sufficient water to give the mass of pulp upon the washing-incline B the proper degree of fluidity, and even some dry ores may in this manner be concentrated quite closely without any water. Most ores, however, will not admit of the least disturbance even of the upper coarser parts of the layer of mineral by the scraping-blades G, and it is necessary to remove the last traces of the gangue by the scouring action of a film or light current of wash-water flowing downward over the washing-incline B. It is important, for the reasons above mentioned, that the wash-water should be delivered upon the washing-incline B absolutely without shock or violent impact, which would tend to cause re-suspension of the fine mineral.

The scraping-blades are arranged to move over a portion only of the washing-incline B, the upper portion being left free to the action of the wash-water which carries downward that small part of the gangue not removed by the scraping-blades G. The wash-water issues from the water vessel P, which may be of any convenient form, arranged so as to deliver the water evenly across the entire width of the water-apron O. The water issues from the water vessel P, necessarily with considerable velocity, and falls upon the water-apron O, which receives and destroys the force of its first impact. The water is spread evenly over the surface of the water-apron O, and thence flows quietly downward, assuming the velocity of flow due to the inclination of the water-apron O, and, on reaching the washing-incline B, continues its downward course with the same velocity. The cleaned mineral travels upward beneath this current of water and on reaching the slot R is instantly discharged from the tray and falls through the collecting troughs or sluices S S, &c., and with a small quantity of water flows continuously from the valves $r$ $r$, &c., into a suitable receptacle T. By properly regulating the area of the regulating-valves $r$ $r$, &c., according to the amount of mineral contained in the ore under treatment we allow a small quantity of water to flow from the outlets $r$ $r$, &c., with the mineral, and thus establish a slight downward current within the slot R, which insures the downward passage and prompt discharge of the fine mineral. It will be seen that the instant the mineral falls below the surface-line of the tray it is free from the action of any disturbing forces and will with certainty be conducted away and saved.

We claim the following:

1. In an ore-concentrator, the combination, with a reciprocating ore-bed and means for determining the water-level thereon, of a pulp-screening surface slightly inclined from the horizontal, having the portion which receives the pulp immersed in the body of water flowing upon said ore-bed and having its other, downstream, portion raised above the surface of the water, substantially as and for the purposes described.

2. In an ore-concentrator the combination of a reciprocating tray and means for maintaining a sufficient depth of flowing water therein, with the pan E attached thereto having an inclined perforated bottom, the upstream portion having an upright transverse partition which being immersed in the water allows the free passage of the coarse parts of the pulp while the downstream portion projects above the surface of the water so as to arrest and retain the floating scum, all being arranged to operate substantially as described.

3. In an ore-concentrator, the combination with a reciprocating ore-bed, and means for maintaining a sufficient depth of water therein, of a screening-pan having closed sides and ends and a perforated bottom partially immersed in the water and inclining in opposition to the direction of movement thereof, to operate, substantially as described.

4. In an ore-concentrator, the combination of a reciprocating ore-bed with the perforated scraping-blades G, G &c., attached to endless chains or belts provided with means for imparting motion thereto, whereby said blades are caused to move over, on nearly parallel lines with, and at an adjustable distance above, such ore-bed, substantially as, and for the purposes set forth.

5. In an ore-concentrator, the combination of an ore-bed having an inclined portion constituting a washing-incline, means to supply water thereto, a transverse slot in said inclined portion and means to regulate the flow of water through said slots, substantially as and for the purpose set forth.

6. In an ore-concentrator, the combination of an ore-bed having an inclined portion constituting a washing-incline and means to supply water thereto, a transverse slot in said inclined portion, and the troughs S and means to regulate the flow of water therefrom, substantially as described.

HORACE P. TOBEY.
GEO. B. THAYER.

Witnesses:
WM. A. LEONARD,
LUKE HILLARD.